United States Patent
Vazquez Carames

(10) Patent No.: US 10,361,999 B2
(45) Date of Patent: Jul. 23, 2019

(54) CATEGORY-BASED DATA LOSS PREVENTION FOR NETWORK-CONNECTED DEVICES

(71) Applicant: Dell Software Inc., Round Rock, TX (US)

(72) Inventor: Hugo Vazquez Carames, Barcelona (ES)

(73) Assignee: SONICWALL INC., Milpitas, CA (US)

( * ) Notice: Subject to any disclaimer, the term of this patent is extended or adjusted under 35 U.S.C. 154(b) by 411 days.

(21) Appl. No.: 14/956,298

(22) Filed: Dec. 1, 2015

(65) Prior Publication Data
US 2017/0155622 A1 Jun. 1, 2017

(51) Int. Cl.
*H04L 29/06* (2006.01)
(52) U.S. Cl.
CPC ......... *H04L 63/0245* (2013.01); *H04L 63/20* (2013.01)
(58) Field of Classification Search
CPC ...... H04L 63/20; H04L 63/0245; H04L 29/06
See application file for complete search history.

(56) References Cited

U.S. PATENT DOCUMENTS

| | | | | |
|---|---|---|---|---|
| 9,419,942 | B1* | 8/2016 | Buruganahalli | H04L 63/0227 |
| 2008/0028436 | A1* | 1/2008 | Hannel | H04L 63/0218 |
| | | | | 726/1 |
| 2014/0304373 | A1* | 10/2014 | Tarbox | H04L 65/60 |
| | | | | 709/219 |
| 2015/0113629 | A1* | 4/2015 | Park | H04L 63/02 |
| | | | | 726/13 |
| 2015/0181415 | A1* | 6/2015 | Raleigh | H04W 8/22 |
| | | | | 455/418 |

* cited by examiner

*Primary Examiner* — Khoi V Le
(74) *Attorney, Agent, or Firm* — Polsinelli LLP

(57) ABSTRACT

A network-connected device (such as an "internet of things" device) that periodically transmits data to recipient devices (e.g., smartphones, tablets, laptops) may be protected by a firewall that include software firewall elements, hardware firewall elements, or some combination thereof. The firewall may intercept datasets sent by the network-connected device, inspect the datasets, and categorize data within each dataset as belonging to one of a number of previously-identified data categories, such as personal data, location data, behavior data, or energy data, or as not belonging to any recognized data category. Rules within firewall policies may indicate whether data of each data category is to be allowed to be sent to the recipient devices or to be blocked from being sent to the recipient devices, for example allowing a firewall to block transmission of location data. Data not belonging to a recognized data category is sent to a support system for classification.

18 Claims, 8 Drawing Sheets

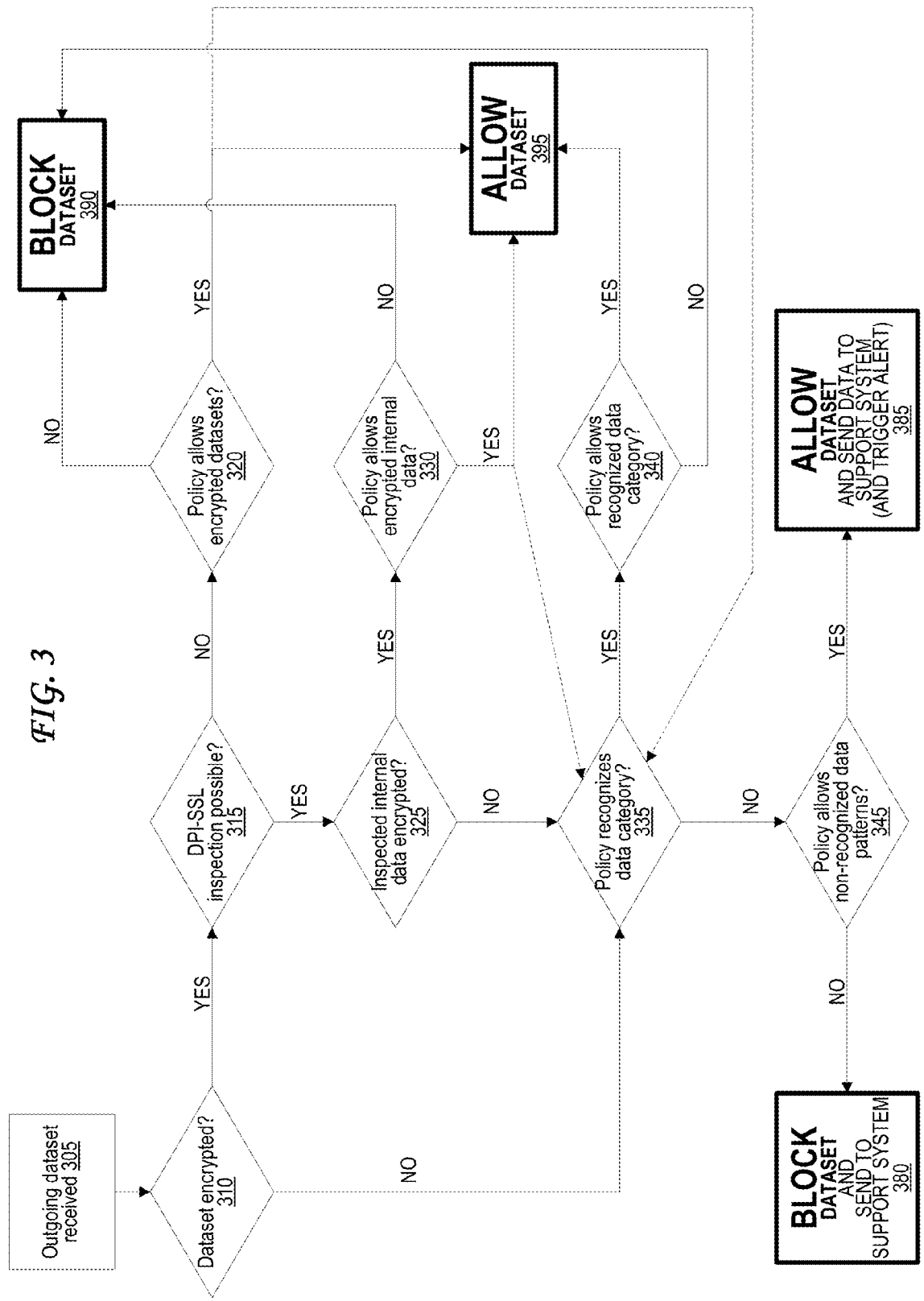

CATEGORY-BASED DATA LOSS PREVENTION FOR NETWORK-CONNECTED DEVICES

BACKGROUND OF THE INVENTION

Field of the Invention

The present invention generally relates to network security. More specifically, the present invention relates to a firewall that identifies unrecognized categories and learns from those categories to prevent leakage of personal data.

Description of the Related Art

Network-based data communications are useful for a variety of tasks, such as sending and receiving emails, browsing Internet webpages, browsing intranet private network portals, sending and receiving instant messages, telephone calls over voice-over-internet-protocol (VOIP) services, and video calls. However, network-based data communications can be dangerous when viruses, adware, spyware, or other kinds of malware are unwittingly transmitted to a user device. Such malware may have been inserted into a web content server by a third party attacker, or may have been injected into a data transmission from the web content server (e.g., via a man-in-the-middle attack) by the third party attacker, or may be sent directly to a client device from the third party attacker.

Typically, firewall systems accept incoming data, filter through the incoming data to identify and block potentially dangerous incoming data, and allow transmission of only data that is safe to transmit. Some firewalls also automatically perform antivirus scans or malware scans of data that the firewall has deemed to be otherwise allowable, which may further be used to block dangerous data in the event that a virus is found.

Network-connected devices, also referred to as "internet of things" devices, can include a variety of everyday devices such as light bulbs, kitchen appliances, cameras, thermostats, and cars. These network-connected devices typically receive instructions over the network that determine how they are to perform, either in the form of periodic commands or settings for autonomous or semi-autonomous operation. Sometimes these devices also transmit data back to the user, including location data, camera footage, operational log data. Some of this data may include personal data that the user would prefer not to be sent to other entities that might otherwise receive data from these devices, such as vendors and manufacturers of network-connected devices and systems compatible with network-connected devices.

Therefore, there is a need for improved firewall for protecting personal data used by network-connected devices.

SUMMARY OF THE CLAIMED INVENTION

One exemplary method for data filtering includes intercepting a first dataset at a firewall instance, the first dataset transmitted by a network-connected device and directed to one or more recipient devices. The method also includes inspecting the first dataset. The method also includes identifying a first data chunk that includes at least a subset of the first dataset. The method also includes comparing the first data chunk to one or more data category definitions corresponding to one or more data categories. The method also includes recognizing that the first data chunk matches a first data category definition of the one or more data category definitions, the first data category definition corresponding to a first data category. The method also includes retrieving a stored firewall policy identifying a first filter rule corresponding to the first data category. The method also includes blocking transmission of at least the first data chunk to the one or more recipient devices based on the first filter rule.

One exemplary system for data filtering includes a communication transceiver in communicative contact at least with a network-connected device and one or more recipient devices, the communication transceiver to intercept a first dataset, the first dataset transmitted by the network-connected device and directed to the one or more recipient devices. The system also includes a processor coupled to a memory and to the communication transceiver. Execution of instructions stored in the memory by the processor performs a variety of system operations. The system operations include inspecting the first dataset. The system operations also include identifying a first data chunk that includes at least a subset of the first dataset. The system operations also include comparing the first data chunk to one or more data category definitions corresponding to one or more data categories. The system operations also include recognizing that the first data chunk matches a first data category definition of the one or more data category definitions, the first data category definition corresponding to a first data category. The system operations also include retrieving a stored firewall policy identifying a first filter rule corresponding to the first data category. The system operations also include blocking transmission of at least the first data chunk to the one or more recipient devices based on the first filter rule.

One exemplary non-transitory computer-readable storage medium may have embodied thereon a program executable by a processor to perform a method for data filtering. The exemplary program method includes intercepting a first dataset at a firewall instance, the first dataset transmitted by a network-connected device and directed to one or more recipient devices. The program method also includes inspecting the first dataset. The program method also includes identifying a first data chunk that includes at least a subset of the first dataset. The program method also includes comparing the first data chunk to one or more data category definitions corresponding to one or more data categories. The program method also includes recognizing that the first data chunk matches a first data category definition of the one or more data category definitions, the first data category definition corresponding to a first data category. The program method also includes retrieving a stored firewall policy identifying a first filter rule corresponding to the first data category. The program method also includes blocking transmission of at least the first data chunk to the one or more recipient devices based on the first filter rule.

BRIEF DESCRIPTION OF THE FIGURES

FIG. 3 is a flow diagram illustrating exemplary operations of an exemplary firewall instance.

DETAILED DESCRIPTION

A network-connected device (such as an "internet of things" device) that periodically transmits data to recipient devices (e.g., smartphones, tablets, laptops, servers, server networks, internet-distributed server "clouds") may be protected by a firewall that include software firewall elements, hardware firewall elements, or some combination thereof. The firewall may intercept datasets sent by the network-connected device, inspect the datasets, and categorize data within each dataset as belonging to one of a number of previously-identified data categories, such as personal data, location data, behavior data, or energy data, or as not belonging to any recognized data category. Rules within firewall policies may indicate whether data of each data category is to be allowed to be sent to the recipient devices or to be blocked from being sent to the recipient devices, for example allowing a firewall to block transmission of location data. Data not belonging to a recognized data category is sent to a support system for classification.

Figure 1:
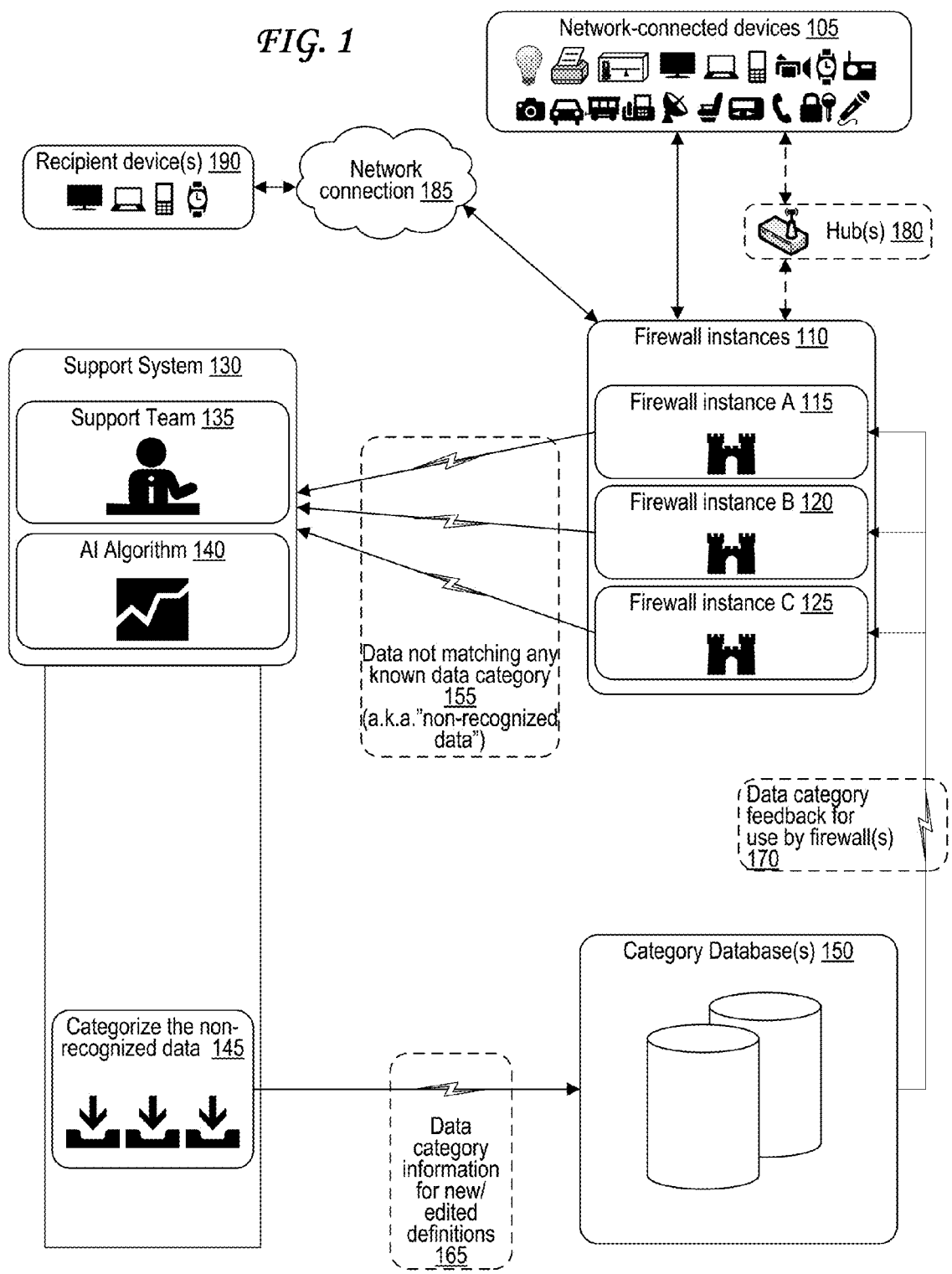
FIG. 1 illustrates a firewall ecosystem that includes three firewall instances and one or more network-connected devices.

FIG. 1 illustrates a firewall ecosystem that includes three firewall instances and one or more network-connected devices.

The firewall ecosystem of FIG. 1 includes one or more network connected devices 105. These are devices that receive and/or transmit data to a user device that is accessible to a user or otherwise affects a user. The set of network-connected devices 105 may include a variety of everyday devices such as light bulbs, refrigerators, ovens, stovetops, microwaves, slow cookers, pressure cookers, rice cookers, food thermometers, pots, pans, other kitchen appliances, video cameras, security cameras, photography cameras, home security systems, motion sensors, door locks, doors, thermostats, thermometers, smoke alarms, phones, answering machines, cars, motorcycles, bicycles, scooters, skateboards, buses, trains, trams, trolleys, media players, printers, televisions, chairs, beds, recliners, couches, wearable devices (e.g., watches, bands, glasses, necklaces, and other clothing/accessories), as well as more computer-centric devices such as cellphones, tablet computers, portable video game consoles, laptop computers, desktop computers, home video game consoles, and television media center devices.

The one or more network connected devices 105 may include wired or wireless communication modules, including communication receivers, communication transmitters, or some combination thereof (e.g., including communication transceivers). These communication module(s) may be used by the network connected devices 105 to send and receive direct data communications, such as data communicated via cable (e.g., Universal Serial Bus "USB" cable, High-Definition Multimedia Interface "HDMI" cable, lightning cable, thunderbolt cable), Bluetooth, visible-light-communications (e.g., in some cases including infrared and/or ultraviolet light), radio-wave communications, microwave communications, sound-based communication (e.g., including audible and/or infrasonic and/or ultrasonic sounds), near-field communications, or some combination thereof. These communication module(s) may also be used by the network connected devices 105 to send and receive data via a network connection 185 to one or more private networks, such as local area networks (LAN), wireless local area networks (WLAN), municipal area networks (MAN), or wide area networks (WAN). These communication module(s) may also be used by the network connected devices 105 to send and receive data via a network connection 185 to the public Internet. These communication module(s) may also be used by the network connected devices 105 to send data to one or more recipient device(s) 190 and/or to receive data from the one or more recipient device(s) 190.

In some cases, the network-connected devices 105 communicate through one or more proxy devices, which may be referred to as one or more hubs 180. These hubs 180 may include routers, computers systems 300, or other network-connected devices 105 (e.g., see examples identified above). In some cases, the hub(s) 180 may include superior connective capabilities (e.g., connecting via a network connection 185 to the Internet while associated network-connected devices 105 are only capable of Bluetooth communication), superior processing capabilities (e.g., faster processor and/or graphics), superior memory and data storage capabilities (e.g., the hub 180 may include or be coupled to a hard drive or flash drive or optical drive), superior security capabilities (e.g., hardware or software firewalls, antivirus software, anti-malware software, more frequent software/firmware updates), or some combination thereof. A hub 180 may be a single centralized proxy device, or one of several semi-centralized proxy devices (e.g., to cover a larger physical area or a larger data bandwidth) which may optionally communicate with each other as well as with recipient devices in the private network or internet. Further references herein to the hub 180 should be understood to refer alternately to a single centralized hub 180 or multiple semi-centralized hubs 180.

The firewall ecosystem of FIG. 1 illustrates a number of firewall instances 110 coupled to the various network-connected devices 105 and filtering incoming and outgoing communications between the network-connected devices 105 and recipient device(s) 190 accessible via a network connection 185 to one or more private networks and/or to the Internet. In particular, the firewall instances 110 of FIG. 1 include Firewall Instance A 115, Firewall Instance B 120, and Firewall Instance C 125. Other environments may include more or fewer firewall instances 110.

Each of the firewall instances 110 may include elements of a hardware firewall, elements of a software firewall, or some combination thereof. At least part of each firewall instance of the firewall instances 110 may be executed at a network-connected device of the network-connected devices 105, or may be executed at a hub 180, or some combination thereof. Alternately, the firewall instances 110 may be performed at least partially by computer systems 300 or other network nodes/devices besides the hub 180 and network-connected devices 105.

When one of the network-connected devices 105 transmits a dataset, the dataset passes to one of the firewall instances 110 (e.g., to Firewall Instance A 115, Firewall Instance B 120, or Firewall Instance C 125). The firewall instance examines the dataset and attempts to recognize a data category of the dataset based on a repertoire of known data categories. The repertoire of known data categories may be stored in a database or other data structure, and may be stored in the same machine as is executing the firewall instance in question, or may be stored on another system (e.g., a category database server) in communicative contact with the system executing the firewall instance in question.

If the firewall instance identifies that the dataset includes data matching a known category, it follows pre-determined rules (which may be stored in the firewall instance or in the category databases 150) regarding how that data is to be treated (e.g., allowed to be sent onward to the recipient device(s) 190, blocked from being sent, encrypted, masked, deleted, overwritten, or some combination thereof).

Identifiable data categories may include, for example, personal data, device data, location data, behavior data, energy data, confidentiality data, and other types of data.

A personal data category may include, for example, a name, a username, a password, a birth date, a sex, a gender, a spouse name, sibling name(s), child name(s), parent name(s), other family name(s), a social security number, a national identity number, a driver's license number, a credit/debit card number, a bank account number, an email address, a home/work/cell phone number, a social network profile identifier, or some combination thereof.

A device data category may include, for example, a device serial number, a device model identifier, a device owner/purchaser identifier, a device screen identifier (e.g., screen resolution identifier, screen size identifier, screen technology identifier), a device Media Access Control (MAC) address, a device Internet Protocol (IP) address, a device network identifier, or some combination thereof.

A location data category may include, for example, a country identifier, a county identifier, a city identifier, a set of global positioning system (GPS) coordinates (e.g., latitude and longitude), cellular triangulation location data, Wi-Fi network location data, a Wi-Fi Service Set Identifier (SSID), a Wi-Fi neighboring network identifier, a traceroute log, or some combination thereof.

A behavior data category may include, for example, time data, usage log data, a browser identifier (e.g., Firefox, Chrome, Safari, Edge, Internet Explorer, Opera), a browser version identifier, a software usage log, a search log, a keyboard log, or some combination thereof.

An energy data category may include, for example, startup/shutdown log data, battery charging log data, energy consumption rate data, or some combination thereof.

A confidentiality data category may include, for example, data that has been marked by a confidentiality marker, identifying that marked data is restricted data, confidential data, secret data, top secret data, Sensitive Compartmented Information (SCI) data, "for official use only" data, trade secret data, other classification types, or some combination thereof.

Other miscellaneous data categories may be also be identified at the category database(s) 150.

If the firewall instance identifies that the dataset from the network-connected device(s) 105 includes data not matching any known category (which may be referred to hereafter as "non-recognized data"), that data, or the entire dataset, may then be sent to a support system 130 via a transmission 155.

The support system 130 may include a support team 135 of one or more human beings (e.g., engineers or technicians) and/or an artificially intelligent algorithm 140 (e.g., using machine learning techniques to recognize patterns by seeing numerous examples) that may inspect the non-recognized data from transmission 155 and determine whether the non-recognized data matches an existing data type or category whose definition (e.g., rules for recognizing data of this category) should be broadened or altered, or whether the data should be placed into a new data type or category that should be created, defined (e.g., via rules for recognizing data of this category), and stored within the category database(s) 150. Definitions of categories as stored in the category database(s) 150 may include rules (e.g., identifying patterns of parsed characters, strings, numbers, bytes, bits, or some combination thereof that may identify data of a particular data category), examples, or some combination thereof.

The support system 160 thus performs classification of the non-recognized data categories 145 via the support team 135, the artificially intelligent algorithm 140, or some combination thereof. The support system 160 then transmits information 165 to the category database(s) 150, the information 165 to be used to create and define a new data category or to broaden/alter a definition of an existing data category.

The category database(s) 150 may then send a feedback transmission 170 back to one or more of the firewall instances 110 identifying classification 145, any new or altered data category definitions, or some combination thereof.

In some cases, the support system 130 may categorize the non-recognized data quickly enough to aid the relevant firewall instance in determining whether it should be allowed to be sent or blocked, such as when the support system 130 categorizes the non-recognized data using the artificially intelligent algorithm 140 and/or if the firewall instance institutes a delay during which it waits for a response from the support system 130 and/or category database(s) 150 before transmitting such data.

In other cases, the support system 130 may take too long to categorize the non-recognized data to be able to determine whether the non-recognized data should be allowed or denied during the transmission of a particular dataset. In these cases, a rule may be stored at the firewall instance and/or the category database(s) 150 that dictates whether non-recognized data should be allowed or blocked. Blocking non-recognized data may be more secure, but may in some cases break functionality of certain devices. Allowing non-recognized data is better at maintaining functionality of devices, but may in some cases be less secure.

Figure 4:
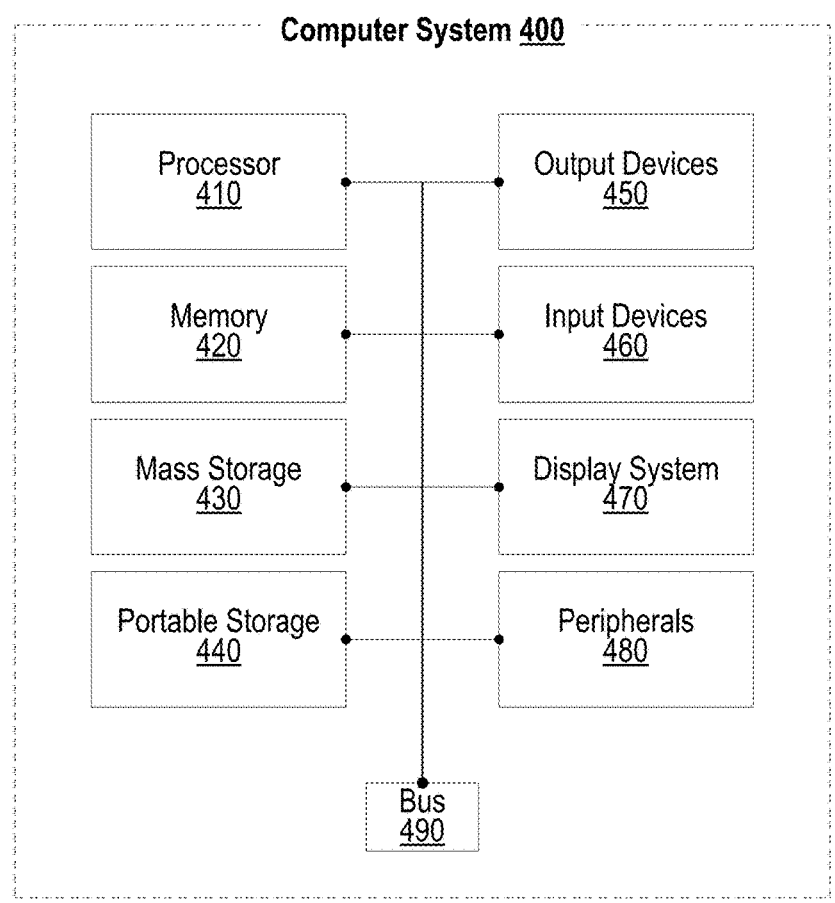
FIG. 4 is a block diagram of an exemplary computing device that may be used to implement an embodiment of the present invention.

Each network-connected device of the network-connected devices 105 may include at least one variant of computer system 400 identified in FIG. 4 or its description, or may include at least a subset of the hardware components and software elements identified in FIG. 4 or its description. Each network-connected device of the network-connected devices 105 may include one or more memory and/or data storage module(s) (e.g. which may include any kind of memory 420, mass storage 430, portable storage 440, or some combination thereof), one or more processor(s) (e.g., processor 410), one or more input mechanism(s) (e.g. one or more input devices 460), one or more display screen(s) (e.g., such as display system 470), or some combination thereof. Each network-connected device of the network-connected devices 105 may include one or more such systems, which may be privately networked or distributed or some combination thereof, and which may include physical systems or virtual systems or some combination thereof.

The hub 180 may include at least one variant of computer system 400 identified in FIG. 4 or its description, or may include at least a subset of the hardware components and software elements identified in FIG. 4 or its description. The hub 180 may include one or more memory and/or data storage module(s) (e.g., which may include any kind of memory 420, mass storage 430, portable storage 440, or some combination thereof), one or more processor(s) (e.g., processor 410), one or more input mechanism(s) (e.g., one or more input devices 460), one or more display screen(s) (e.g., such as display system 470), or some combination thereof. The hub 180 may include one or more such systems, which may be privately networked or distributed or some combination thereof, and which may include physical systems or virtual systems or some combination thereof.

The support system 130 may include at least one variant of computer system 400 identified in FIG. 4 or its description, or may include at least a subset of the hardware components and software elements identified in FIG. 4 or its description. The support system 130 may include one or more memory and/or data storage module(s) (e.g. which may include any kind of memory 420, mass storage 430, portable storage 440, or some combination thereof), one or more processor(s) (e.g. processor 410), one or more input mechanism(s) (e.g. one or more input devices 460), one or more display screen(s) (e.g., such as display system 470), or some combination thereof. The support system 130 may include one or more such systems, which may be privately networked or distributed or some combination thereof, and which may include physical systems or virtual systems or some combination thereof.

Each recipient device of the recipient device(s) 190 may include at least one variant of computer system 400 identified in FIG. 4 or its description, or may include at least a subset of the hardware components and software elements identified in FIG. 4 or its description. Each recipient device of the recipient device(s) 190 may include one or more memory and/or data storage module(s) (e.g., which may include any kind of memory 420, mass storage 430, portable storage 440, or some combination thereof), one or more processor(s) (e.g., processor 410), one or more input mechanism(s) (e.g., one or more input devices 460), one or more display screen(s) (e.g., such as display system 470), or some combination thereof. Each recipient device of the recipient device(s) 190 may include one or more such systems, which may be privately networked or distributed or some combination thereof, and which may include physical systems or virtual systems or some combination thereof.

Figure 2A:
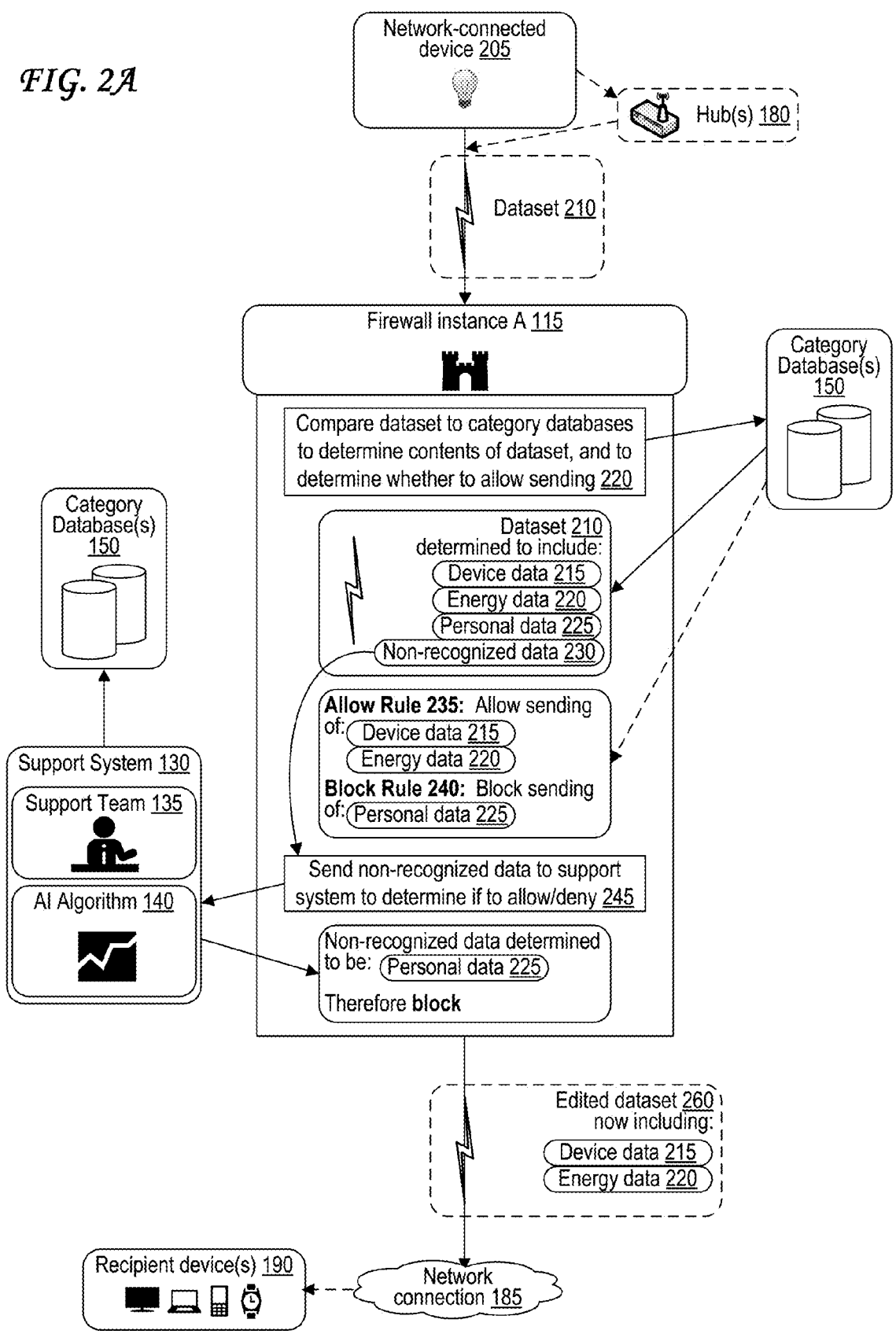
FIG. 2A illustrates transmission of an exemplary dataset from an exemplary network-connected device through a firewall instance that allows transmission of device data and energy data while blocking transmission of personal data, and that uses a support system to determine how to categorize non-recognized data.

FIG. 2A illustrates transmission of an exemplary dataset from an exemplary network-connected device through a firewall instance that allows transmission of device data and energy data while blocking transmission of personal data, and that uses a support system to determine how to categorize non-recognized data.

The exemplary network-connected device 205 of FIG. 2A is illustrated as a smart lightbulb, but may be any of the identified network-connected devices 105 discussed in reference to FIG. 1. The network-connected device 205 may transmit a dataset 210, which may be intercepted by a firewall, which in FIG. 2A is identified as firewall instance A 115 but may in other cases be firewall instance B 120, firewall instance C 125, or another firewall instance.

Once the dataset 210 is intercepted by the firewall instance A 115, the firewall instance A 115 at a step 220 compares the dataset 210 to information from one or more category database(s) 150, which may include definition rules of different data categories (e.g., identifying patterns of parsed characters, strings, numbers, bytes, bits, or some combination thereof that may identify data of a particular data category), definition examples of data from different data categories (e.g., that data from the dataset 210 can be compared to for to determine a degree of similarity or difference), and the like. For example, a definition of the "personal data" data category may include rules that direct the firewall instance A 115 to parse the dataset 210 and search for Extensible Markup Language (XML) markup code with a "<name>" tag, a "<creditcard>" tag, a "<password>" tag, or another markup string tag identifying personal data, or equivalent hexadecimal/binary codes. The definition of the "personal data" data category may alternately or additionally include a number of examples of data that should and/or shouldn't be classified under the "personal data" data category. The firewall instance A 115 may use such examples by comparing them to data from the dataset 210 and categorizing the data as "personal data" if it shows a predetermined level of similarity (e.g., a certain percentage of similar or identical characters/strings/numbers in a similar or identical order) or alternately categorizing the data as not belonging to the "personal data" data category if it does not reach this predetermined level of similarity (or alternately, if it reaches a predetermined level of difference).

A dataset 210 may include various pieces of data belonging to various data categories. For example, the dataset 210 of FIG. 2A is shown to include data in the "device data" data category 215, data in the "energy data" data category 220, data in the "personal data" data category 225, and non-recognized data 230.

The firewall instance A 115 includes an allow rule 235 and a block rule 240. The allow rule 235 and a block rule 240 may in some cases be obtained from the category database(s) 150. The allow rule 235 and a block rule 240 may alternately or additionally be stored within a memory associated with the firewall instance A 115 (e.g., a memory of a device executing at least part of any software elements of the firewall instance A 115, or a memory of a device including at least part of any hardware elements of the firewall instance A 115, or some combination thereof). The allow rule 235 and a block rule 240 may be stored at the firewall instance A 115 following adjustment by a user using a user interface, such as a "firewall settings" user interface of a device (e.g., a device executing at least part of any software elements of the firewall instance A 115, a device including at least part of any hardware elements of the firewall instance A 115, or some combination thereof). Such a user interface may be access via a web browser, via an operating system settings console, via a terminal, via a hardware interface (e.g., dedicated switches/buttons/levers/keypad), via a dedicated software application, or some combination thereof.

The allow rule 235 of FIG. 2A indicates that data in the "device data" category 215 and data in the "energy data" category 220 should be allowed to be transmitted by the network-connected device 205 to the recipient device(s) 190. The block rule 240 of FIG. 2A indicates that data in the "personal data" category 225 should be blocked from transmission from the network-connected device 205 to the recipient device(s) 190.

The allow rule 235 and block rule 240 of FIG. 2A do not identify what is to be done with non-recognized data 230 (e.g., whether it is to be categorized into a particular data category, and whether it is to be allowed or blocked). Therefore, the firewall instance A 115 of FIG. 2A relies on the support system 130 to categorize the non-recognized data 230 upon sending.

The support system 130, in FIG. 2A, determines that the non-recognized data 230 is data that should be categorized in the "personal data" data category 225. It sends this determination back to the firewall instance A 115, which then determines that the formerly non-recognized data 230 should be blocked according to its new categorization and according to the block rule 240 of FIG. 2A. The support system 130 may also transmit data to the category database (s) 150, such as instructions for adjusting data category definition rules or providing additional data category definition examples based on the non-recognized data 230 of FIG. 2A.

The firewall instance A 115 then transmits an edited dataset 260 to the recipient device(s) 190 via the network connection 185. The edited dataset 260 of FIG. 2A includes the data from the dataset 210 that was categorized into the "device data" category 215 and into the "energy data" category 220. The edited dataset 260 of FIG. 2A lacks the data from the dataset 210 that was categorized into the "personal data" data category 225, including the formerly non-recognized data 230.

Step 245 of FIG. 2A can include waiting until the support system 130 has made its decision regarding how the non-recognized data 230 is to be categorized (e.g., either into an existing category or into a new category). In some cases, such a delay may be brief (e.g., a few seconds or even milliseconds), such as when the support system 130 uses the artificially intelligent algorithm 140 to categorize the non-recognized data 230. However, in other cases, the delay may be longer (e.g., a few minutes, hours, days, or even weeks), such as when the support team 135 of the support system 130 is used to categorize the non-recognized data 230. In such cases, the allow rule 235 or the block rule 240 may be adjusted to allow or block non-recognized data 230 either immediately (e.g., see FIG. 2B, FIG. 2C, FIG. 2D, and FIG. 2E) or after a predetermined time period has elapsed.

Figure 2B:
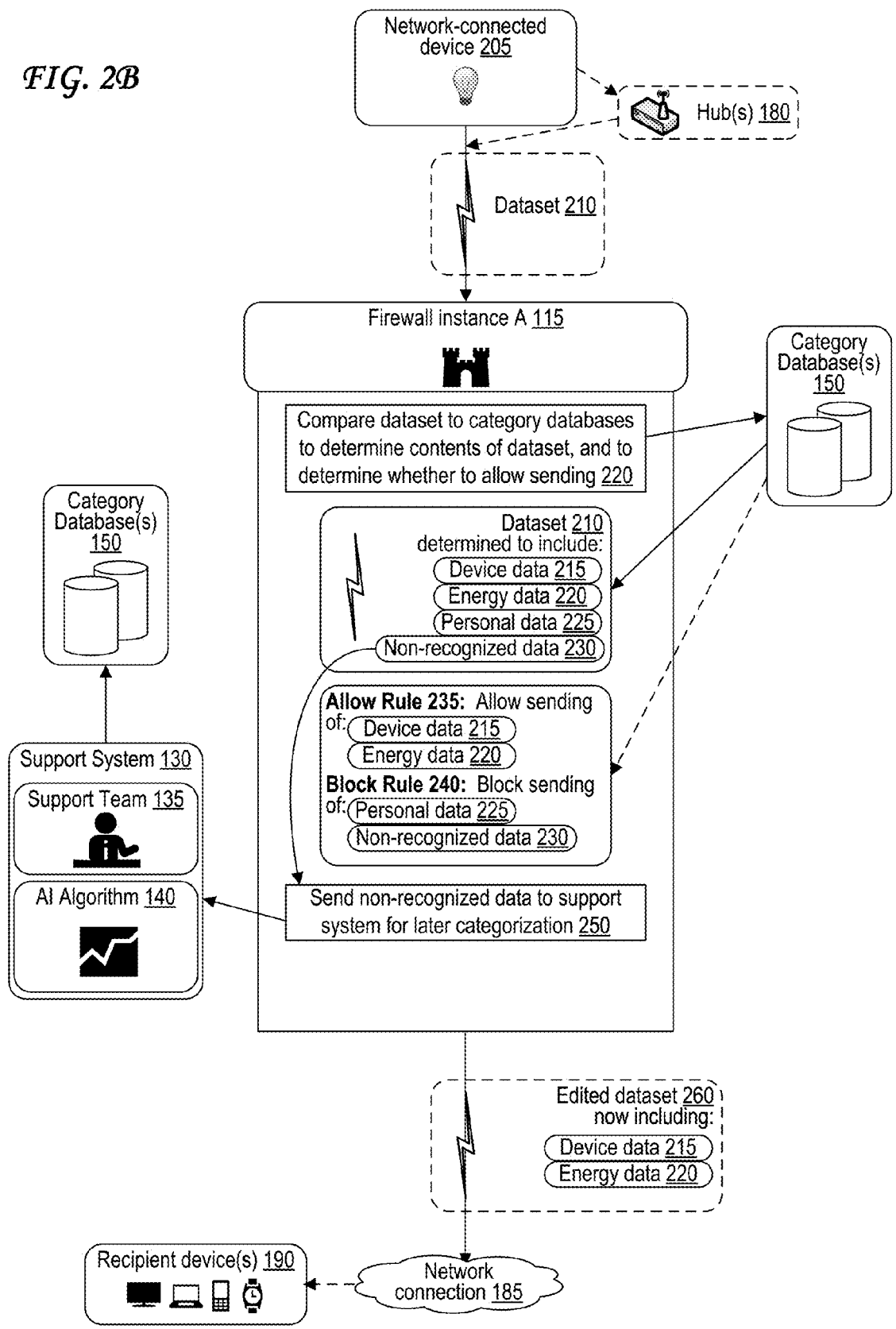
FIG. 2B illustrates transmission of an exemplary dataset from an exemplary network-connected device through a firewall instance that allows transmission of device data and energy data while blocking transmission of personal data and non-recognized data.

FIG. 2B illustrates transmission of an exemplary dataset from an exemplary network-connected device through a firewall instance that allows transmission of device data and energy data while blocking transmission of personal data and non-recognized data.

The transmission illustrated in FIG. 2B is similar to the transmission illustrated in FIG. 2A, but the block rule 240 of FIG. 2B is adjusted to block non-recognized data 230. Thus, the non-recognized data 230 is still sent to the support system 130 at a step 250, but with the idea that it will be analyzed later and used to improve the category database(s) 150.

Because the block rule 240 of FIG. 2B blocks all non-recognized data 230, the edited dataset 260 of FIG. 2B includes the data from the dataset 210 that was categorized into the "device data" category 215 and into the "energy data" category 220. The edited dataset 260 of FIG. 2B lacks the data from the dataset 210 that was categorized into the "personal data" data category 225 and also lacks the data from the dataset 210 that was classified as non-recognized data 230.

Blocking all non-recognized data 230 by default, as in the block rule 240 of FIG. 2B, may result in increased security, since personal data and other potentially sensitive data that might be stored, unrecognized, in the non-recognized data 230, is not transmitted. However, blocking all non-recognized data 230 by default, as in the block rule 240 of FIG. 2B, may in some cases break functionality of certain network-connected devices 105, for example by removing data used to maintain a certain format, order, or division of data that the recipient device(s) 190 need to properly interpret the edited dataset 260 (formerly the dataset 210), or that might be necessary for a security feature when reading the edited dataset 260 (formerly the dataset 210) at the recipient device(s) 190, or that might be necessary for the edited dataset 260 (formerly the dataset 210) to properly reach the recipient device(s) 190.

Figure 2C:
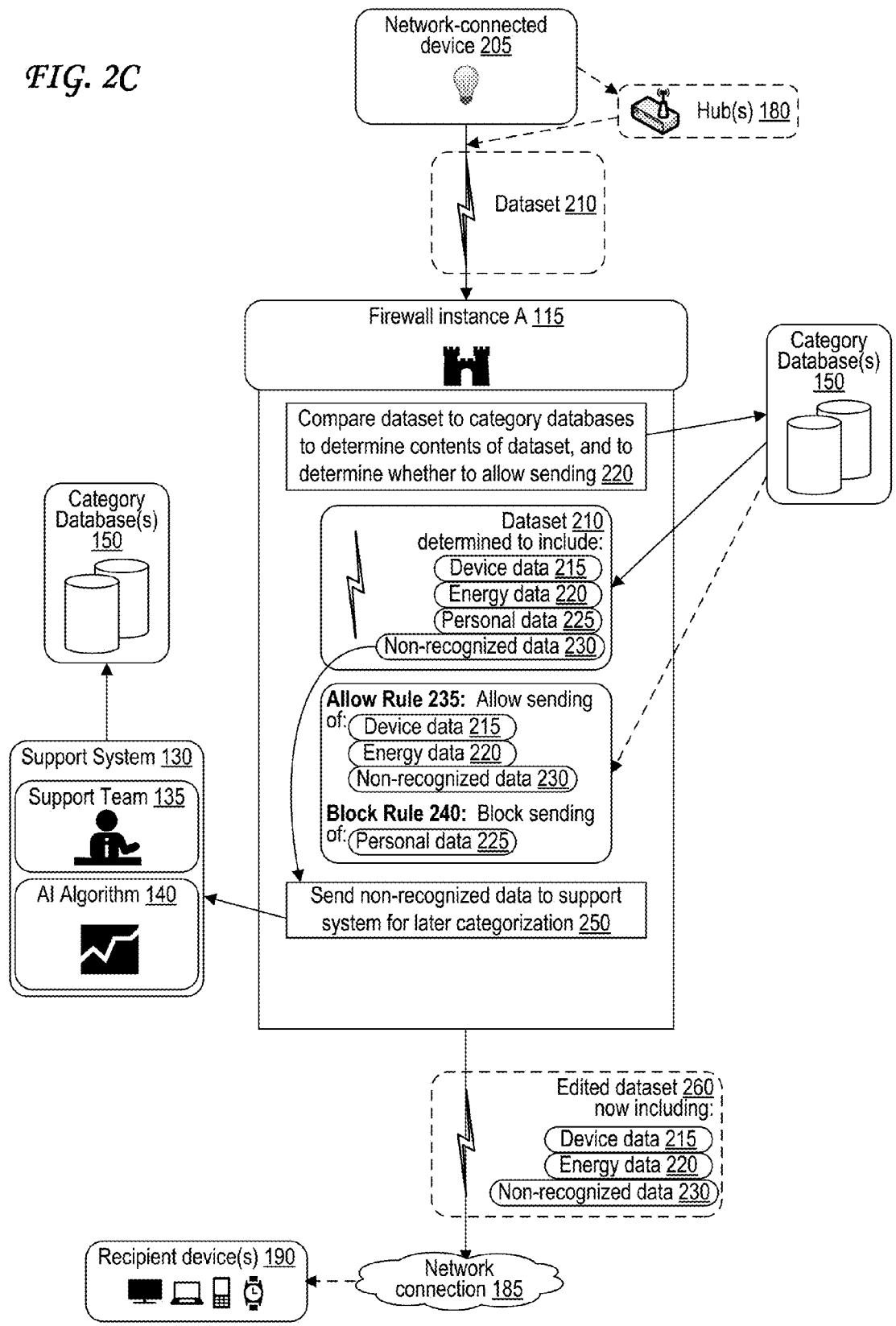
FIG. 2C illustrates transmission of an exemplary dataset from an exemplary network-connected device through a firewall instance that allows transmission of device data and energy data and non-recognized data while blocking transmission of personal data.

FIG. 2C illustrates transmission of an exemplary dataset from an exemplary network-connected device through a firewall instance that allows transmission of device data and energy data and non-recognized data while blocking transmission of personal data.

The transmission illustrated in FIG. 2C is similar to the transmission illustrated in FIG. 2B, but the allow rule 235 of FIG. 2C is adjusted to allow non-recognized data 230, and the block rule 240 of FIG. 2C is adjust to no longer block the non-recognized data 230. Like FIG. 2B, the non-recognized data 230 is still sent to the support system 130 at step 250, but with the idea that it will be analyzed later and used to improve the category database(s) 150.

Because the allow rule 225 of FIG. 2C allows all non-recognized data 230, the edited dataset 260 of FIG. 2B includes the data from the dataset 210 that was categorized into the "device data" category 215, the data from the dataset 210 that was categorized into the "energy data" category 220, and the non-recognized data 230. The edited dataset 260 of FIG. 2C lacks only the data from the dataset 210 that was categorized into the "personal data" data category 225.

Allowing all non-recognized data 230 by default, as in the allow rule 235 of FIG. 2C, may result in increased functionality, since no non-recognized data 230 is removed that, if removed, might break functionality of certain network-connected devices 105. In some cases, however, allowing all non-recognized data 230 by default, as in the allow rule 235 of FIG. 2C, may decrease security. since personal data and other potentially sensitive data that might be stored, unrecognized, in the non-recognized data 230, will be allowed to be transmitted.

Figure 2D:
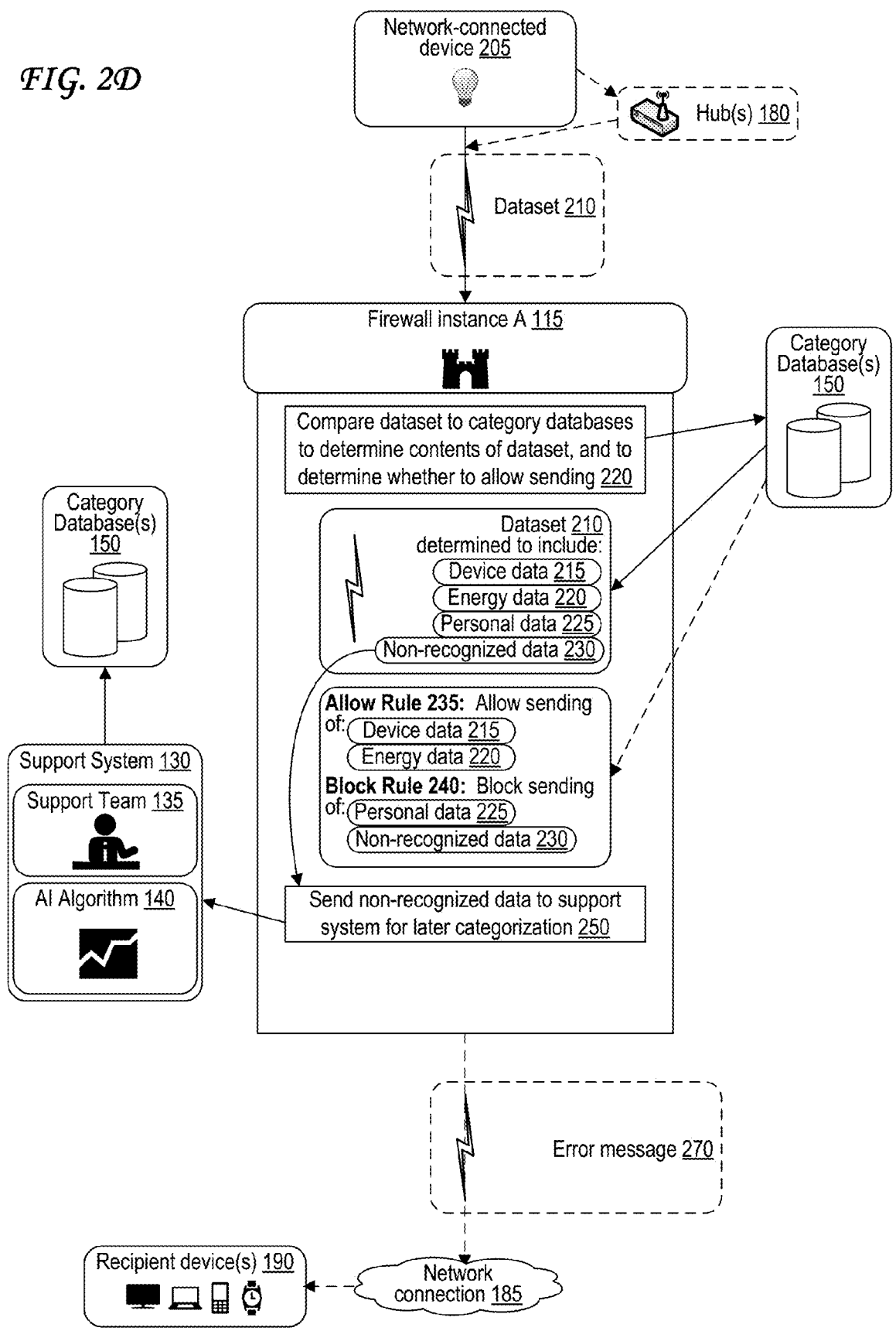
FIG. 2D illustrates transmission of an exemplary dataset from an exemplary network-connected device through a firewall instance that allows transmission of datasets that include only device data and energy data while blocking transmission of datasets that include any personal data or non-recognized data.

FIG. 2D illustrates transmission of an exemplary dataset from an exemplary network-connected device through a firewall instance that allows transmission of datasets that include only device data and energy data while blocking transmission of datasets that include any personal data or non-recognized data.

The allow rule 235 and block rule 240 of FIG. 2D allow and block the same data categories, respectively, as the allow rule 235 and block rule 240 of FIG. 2B. However, the firewall instance A 115 of FIG. 2D interprets and/or executes the allow rule 235 and block rule 240 of FIG. 2D differently from the way that the firewall instance A 115 of FIG. 2B interprets and executes the allow rule 235 and block rule 240 of FIG. 2B.

In particular, the firewall instance A 115 of FIG. 2D does not produce an edited dataset 260, but instead blocks transmission of the entirety of any dataset 210 that includes any data categorized into the "personal data" data category 225, and blocks transmission of the entirety of any dataset 210 that includes any non-recognized data 230.

Because the dataset 210 is recognized as including data categorized into the "personal data" data category 225, and also as including non-recognized data 230, the entire dataset 210 is blocked from transmission by the firewall instance A 115 of FIG. 2D. An error message 270 (e.g., a "403 Forbidden" error message) may optionally be sent to the recipient device(s) 190 notifying the recipient device(s) 190 that the dataset 210 was blocked.

Similarly to FIG. 2B, the firewall instance A 115 of FIG. 2D is even more secure, since it blocks entire datasets 210 when even a small part of the dataset 210 of the is "tainted" by inclusion of data categorized into the "personal data" data category 225 or of non-recognized data 230. However, this approach is likely to break functionality of certain types of network-connected devices 105.

Figure 2E:
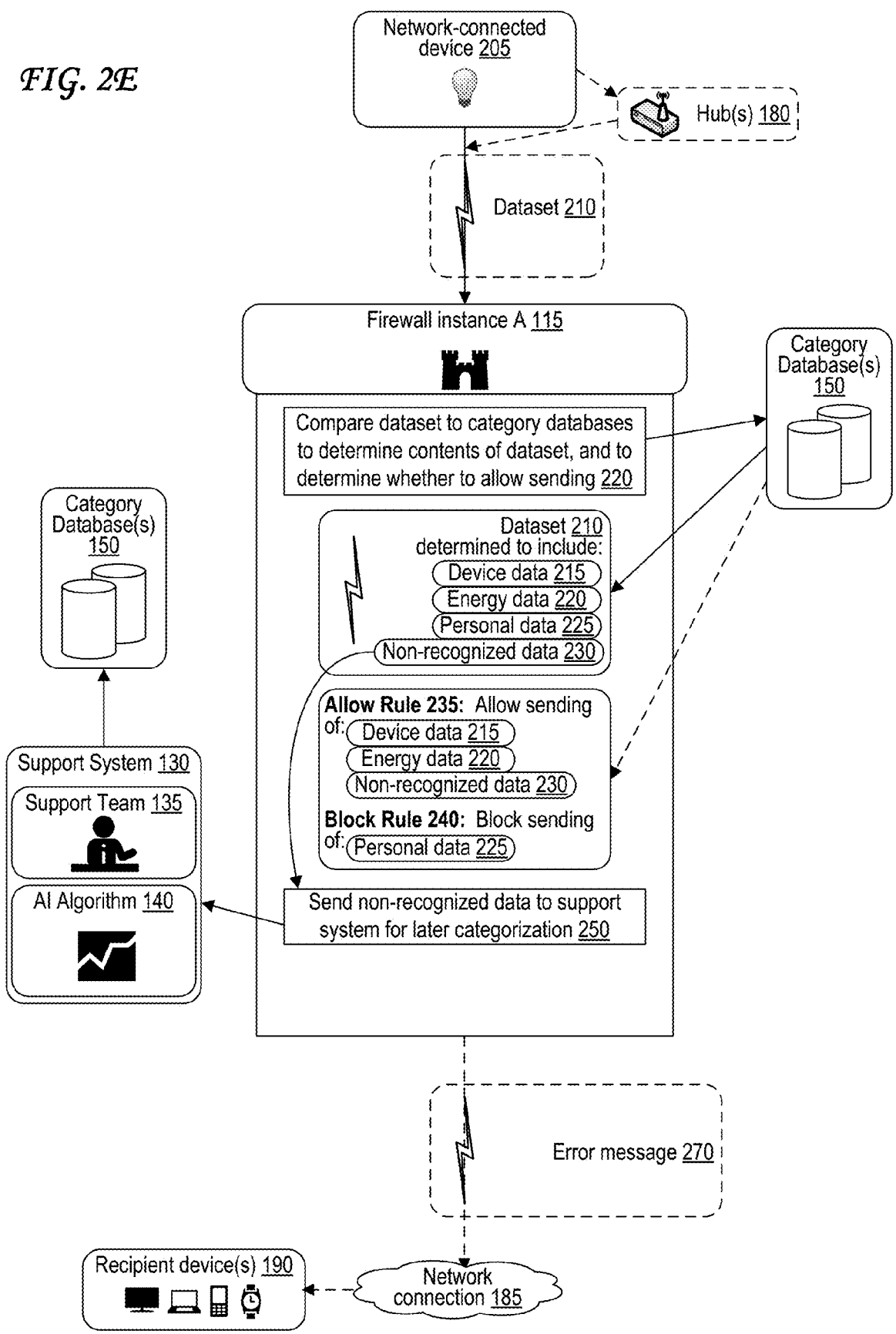
FIG. 2E illustrates transmission of an exemplary dataset from an exemplary network-connected device through a firewall instance that allows transmission of datasets that include only device data and energy data and non-recognized data while blocking transmission of datasets that include any personal data.

FIG. 2E illustrates transmission of an exemplary dataset from an exemplary network-connected device through a firewall instance that allows transmission of datasets that include only device data and energy data and non-recognized data while blocking transmission of datasets that include any personal data.

The firewall instance A 115 of FIG. 2E is similar in its approach to blocking of entire "tainted" datasets 210 to the firewall instance A 115 of FIG. 2D. The allow rule 235 of FIG. 2E, however, allows transmission of non-recognized data 230, and the block rule 240 of FIG. 2E does not block transmission of non-recognized data 230.

However, because the dataset 210 is still recognized as including data categorized into the "personal data" data category 225, the entire dataset 210 is blocked from transmission by the firewall instance A 115 of FIG. 2E. An error message 270 (e.g., a "403 Forbidden" error message) may optionally be sent to the recipient device(s) 190 notifying the recipient device(s) 190 that the dataset 210 was blocked.

Similarly to FIG. 2D, the firewall instance A 115 of FIG. 2E is very secure (between FIG. 2B and FIG. 2D in level of security), since it blocks entire datasets 210 when even a small part of the dataset 210 of the is "tainted" by inclusion of data categorized into the "personal data" data category 225, though is more relaxed about non-recognized data 230. This approach is still likely to break functionality of certain types of network-connected devices 105, though a little less likely than the firewall instance A 115 of FIG. 2E.

In an alternate embodiment (not displayed), allow rule 235 and block rule 240 used by the firewall instance A 115 of FIGS. 2A, 2B, 2C, 2D, and 2E may define different rules depending on which recipient device 190 of a set of multiple recipient devices 190 the dataset 210 is being sent to. For example, data categorized into the "personal data" data category 225 might be allowed to be transmitted to a recipient device 190 that has previously been identified an authorized user device but blocked from being transmitted to a recipient device 190 that is unrecognized or that is recognized as belonging to a malicious server, a device manufacturer server, or a government server. An identity of the intended recipient device 190 may in some cases be recognized by an identifier in an "intended recipient" field of the dataset 210, for example via a destination internet protocol (IP) address or media access control address (MAC) address or some combination thereof.

FIG. 3 is a flow diagram illustrating exemplary operations of an exemplary firewall instance. The operations illustrated in FIG. 3 may be performed by any of the firewall instances 110 of FIG. 1, including the firewall instance A 115 (also illustrated in FIGS. 2A-2E), the firewall instance B 120, and the firewall instance C 125. The operations illustrated in FIG. 3 may also be performed by another firewall instance.

At step 305, the firewall instance receives an outgoing dataset 210 from a network-connected device 205. At step 310, the firewall instance determines whether the dataset 210 is encrypted. If it is, the firewall instance moves on to step 315, but if not, it moves on to step 335.

At step 315, the firewall instance determines whether Deep Packet Inspection of Secure Socket Layer (DPI-SSL) Inspection is possible for the dataset 210. If so, the firewall instance moves on to step 325, but if not, it moves on to step 320.

At step 320, the firewall instance checks its policies to determine whether it allows transmission of encrypted communications. If the policies don't allow transmission of encrypted datasets, the firewall instance blocks transmission of the dataset to the recipient device(s) 190 at step 390. If the policies do allow transmission of encrypted information, the firewall instance either allows transmission of the dataset to the recipient device(s) 190 at step 395 or moves on to step 335.

At step 325, the firewall instance inspects the dataset 210 using DPI-SSL inspection and determines whether the dataset's internal data (uncovered during the DPI-SSL inspection) is encrypted. If so, the firewall instance moves on to step 330, but if not, it moves on to step 335.

At step 330, the firewall instance checks its policies to determine whether it allows transmission of encrypted internal data within a dataset 210. If the policies don't allow transmission of encrypted internal data, the firewall instance blocks transmission of the dataset 210 (or at least the encrypted internal data) to the recipient device(s) 190 at step 390. If the policies do allow transmission of encrypted internal data, the firewall instance either allows transmission of the dataset 210 (or at least the encrypted internal data) to the recipient device(s) 190 at step 395 or moves on to step 335.

At step 335, the firewall instance uses its policies (e.g., provided by the firewall instance, the category databases 150, or some combination thereof) to compare the dataset 210 and/or its internal data to determine whether it recognizes data matching a particular known data category within the dataset 210 (e.g. by comparing to definition rules/examples at the category databases 150). In cases where the dataset 210 or internal data within the dataset 210 is encrypted, the firewall instance may still sometimes be able to identify certain patterns (e.g., identifying that a specific type of encryption was used, identifying that an unencrypted field descriptor reads "password" even though the field itself is encrypted) that could allow the firewall instance to classify the dataset 210 or internal data into a particular data category. If the firewall instance recognizes data from a known data category within the dataset 210, the firewall instance moves to step 340, but if not, it moves instead to step 345.

At step 340, the firewall instance checks its policies (e.g., provided by the firewall instance, the category databases 150, or some combination thereof) to determine whether it allows transmission of data within the recognized data category. If it does, the firewall instance allows transmission of the dataset 210 (or at least the data of the recognized data category) to the recipient device(s) 190 at step 395. If it does not, the firewall instance blocks transmission of the dataset 210 (or at least the data of the recognized data category) to the recipient device(s) 190 at step 390.

At step 345, the firewall instance checks its policies (e.g., provided by the firewall instance, the category databases 150, or some combination thereof) to determine whether it allows transmission of non-recognized data patterns (i.e., data that does not match any known data category). If the firewall instance and/or its policies do allow transmission of non-recognized data, then at step 385, the firewall instance allows transmission of the dataset 210 (or at least the non-recognized data) to the recipient device(s) 190 and also transmits the dataset 210 (or at least the non-recognized data) for analysis to the support system 130, and also optionally transmits an alert identifying that non-recognized data was transmitted (e.g., back to the network-connected device 205, to the recipient devices 190, or to a firewall administrative device such as a user laptop, desktop, or mobile device). If the firewall instance and/or its policies do not allow transmission of non-recognized data, then at step 380, the firewall instance blocks transmission of the dataset 210 (or at least the non-recognized data) to the recipient device(s) 190 and also transmits the dataset 210 (or at least the non-recognized data) for analysis to the support system 130.

FIG. 4 illustrates an exemplary computing system 400 that may be used to implement an embodiment of the present invention. The computing system 400 of FIG. 4 includes one or more processors 410 and memory 410. Main memory 410 stores, in part, instructions and data for execution by processor 410. Main memory 410 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 410 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 410.

Portable storage device 440 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD), a plasma display, an organic light-emitting diode (OLED) display, an electronic ink display, a projector-based display, a holographic display, or another suitable display device. Display system 470 receives textual and graphical information, and processes the information for output to the display device. The display system 470 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 480 may include any type of computer support device to add additional functionality to the computer system. For example, peripheral device(s) 480 may include a modem or a router.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 400 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 400 may be part of a multi-computer system that uses multiple computer systems 400 (e.g., for one or more specific tasks or purposes). For example, the multi-computer system may include multiple computer systems 400 communicatively coupled together via one or more private networks (e.g., at least one LAN, WLAN, MAN, or WAN), or may include multiple computer systems 400 communicatively coupled together via the internet (e.g., a "distributed" system), or some combination thereof.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for data filtering, the method comprising:
storing a plurality of filtering rules associated with one or more security functions at a firewall, wherein each filtering rule is associated with at least one data category and identifies whether data categorized under the at least one data category is allowed be sent to one or more recipient devices;

intercepting a first dataset at the firewall, the first dataset transmitted by a network-connected device and directed to one or more recipient devices;

identifying a first data chunk that includes at least a subset of the first dataset;

comparing the first data chunk to a plurality of data category definitions, wherein at least one of the data category definitions includes a definition rule that identifies a data pattern;

recognizing that the first data chunk matches the at least one category definitions based on an identification that the first data chunk meets a predetermined level of similarity to the data pattern that is consistent with one or more examples of computer data, the matching data category definition associated with a corresponding data category;

retrieving a first filter rule from the plurality of stored filtering rules, the first filtering rule associated with the corresponding data category and identifying that data categorized under a first data category is to be blocked in accordance with an associated security function; and blocking transmission of at least the first data chunk to the one or more recipient devices based on the first filter rule.

2. The method of claim 1, wherein the associated security function concerns controlling distribution of at least one of personal data, device data, location data, behavior data, energy data, confidential data, computer viruses, computer malware, software updates, or firmware updates.

3. The method of claim 1, further comprising inspecting the first dataset by performing a deep packet inspection of secure socket layer (DPI-SSL) encryption of the dataset.

4. The method of claim 1, wherein the plurality of data category definitions include the one or more data examples of the computer data that was previously classified into one or more data categories.

5. The method of claim 1, wherein the network-connected device includes one or more of a one of a light bulb, a lamp, a refrigerator, a cooler, an oven, a stovetop, a grill, a microwave, a slow cooker, a pressure cooker, a rice cooker, a food thermometer, a pot, a pan, a kitchen appliance, a video camera, a security camera, a photography camera, a home security system, a motion sensor, a door lock, a door, a thermostat, a thermometer, a heater, an air conditioner, a fan, a smoke alarm, a pacemaker, a medical implant device, a medical sensor device, a phone, an answering machine, a car, a motorcycle, a bicycle, a scooter, a skateboard, a bus, a train, a tram, a trolley, a watercraft, a manned aircraft, an unmanned aircraft, a vehicle computer device, a home media player device, a portable media player device, a printer, a scanner, a fax machine, a pager, a beeper, a radio, a television, a massager, a user-massaging furniture device, a user-heating furniture device, a heated floor, a chair, a stool, a recliner, a couch, a vehicle seat, a bed, a wearable watch device, a wearable band device, a wearable ring device, a wearable glasses-based device, a wearable necklace device, a wearable clothing device, a wearable jewelry device, a cellular phone, a tablet device, a portable video game console, a home video game console, a laptop computer, a desktop computer, a television, or a media center device.

6. The method of claim 1, wherein the one or more recipient devices include at least one of a desktop computer, a laptop computer, a tablet device, a cellular phone device, a portable video game console, a home video game console, a television, a media center device, a vehicle computer device.

7. The method of claim 1, wherein the first dataset is transmitted by the network-connected device at least partially via at least one of a wireless communication transmitter or a wired communication transmitter.

8. The method of claim 1, wherein the first dataset is transmitted by the network-connected device through a hub device before it is intercepted by the firewall, the hub device including at least one of a wireless communication receiver, a wired communication receiver, or some combination thereof, the hub device also including at least one of a wireless communication transmitter or a wired communication transmitter.

9. The method of claim 1, wherein the plurality of data category definitions are at least partially based on input from a support system that has previously classified one or more non-recognized data chunks previously transmitted by the network-connected device into at least a subset of the plurality of data categories, the one or more non-recognized data chunks previously submitted to the support system by the firewall after the firewall determined that the one or more non-recognized data chunks did not match a previous set of one or more data category definitions.

10. The method of claim 9, wherein the support system classifies the one or more non-recognized data chunks at least partially based on a classifying input received by the support system via a user input device of the support system.

11. The method of claim 9, wherein the support system classifies the one or more non-recognized data chunks at least partially based on an artificially intelligent classifying algorithm that compares the previous set of one or more category definitions to permutations data within the one or more non-recognized data chunks.

12. A system for data filtering, the system comprising:

a data storage that stores a plurality of filtering rules associated with one or more security functions at a firewall, wherein each filtering rule is associated with at least one data category and identifies whether data categorized under the at least one data category is allowed be sent to one or more recipient devices;

a communication transceiver in communicative contact at least with a network-connected device and one or more recipient devices, the communication transceiver to intercept a first dataset, the first dataset transmitted by the network-connected device and directed to the one or more recipient devices; and a processor coupled to a memory and to the communication transceiver, wherein execution of instructions stored at the memory by the processor:

identifies a first data chunk that includes at least a subset of the first dataset, compares the first data chunk to a plurality of data category definitions, wherein at least one of the data category definitions includes a definition rule that identifies a data pattern, recognizes that the first data chunk matches the at least one data category definitions based on an identification that the first data chunk meets a predetermined level of similarity to the data pattern that is consistent with one or more examples of computer data, the matching data category definition associated with a corresponding data category, retrieves a first filter rule from the plurality of stored filtering rules, the first filtering rule associated with the corresponding data category and identifying that data categorized under a first data category is to be blocked in accordance with an associated security function, and blocks transmission of at least the first data chunk to the one or more recipient devices based on the first filter rule.

13. The system of claim 12, wherein the data storage is in the memory.

14. The system of claim 12, further comprising a database server storing the plurality of data category definitions in one or more data structures, wherein the communication transceiver is in communicative contact with the database server.

15. The system of claim 14, wherein the firewall policy is stored in a data structure at the database server.

16. The system of claim 14, wherein the plurality of category definitions include the one or more data examples of the computer data that was previously classified into one or more of the plurality of data categories.

17. The system of claim 14, further comprising a support system in communication with the communication transceiver and that provides input upon which the plurality of data category definitions are at least partially based, wherein the support system previously classified one or more non-recognized data chunks previously transmitted by the network-connected device into at least a subset of the plurality of data categories, and the one or more non-recognized data chunks were previously submitted to the support system after a determination that the one or more non-recognized data chunks did not match a previous set of one or more category definitions.

18. A non-transitory computer-readable storage medium, having embodied thereon a program executable by a processor to perform a method for data filtering, the method comprising:

storing a plurality of filtering rules associated with one or more security functions at a firewall, wherein each filtering rule is associated with at least one data category and identifies whether data categorized under the at least one data category is allowed be sent to one or more recipient devices;

intercepting a first dataset at the firewall, the first dataset transmitted by a network-connected device and directed to one or more recipient devices;

identifying a first data chunk that includes at least a subset of the first dataset;

comparing the first data chunk to a plurality of data category definitions, wherein at least one of the data category definitions includes a definition rule that identifies a data pattern;

recognizing that the first data chunk matches of the at least one data category definitions based on an identification that the first data chunk meets a predetermined level of similarity to the data pattern that is consistent with one or more examples of computer data, the matching data category definition associated with a corresponding data category;

retrieving a first filter rule from the plurality of stored filtering rules, the first filtering rule associated with the corresponding data category and identifying that data categorized under a first data category is to be blocked in accordance with an associated security function; and blocking transmission of at least the first data chunk to the one or more recipient devices based on the first filter rule.

* * * * *